Figure 1:
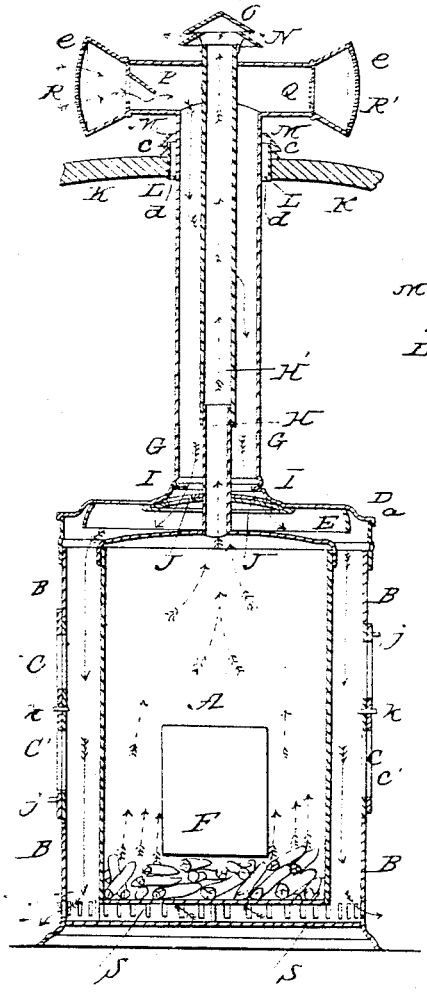
Figure 4:
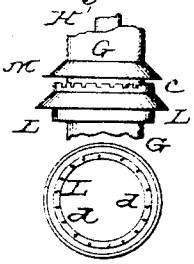
Figure 2:
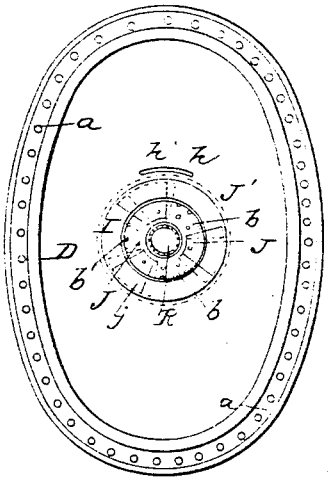
Figure 3:
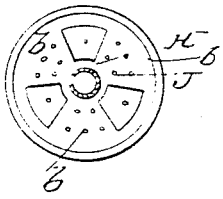
Figure 5:
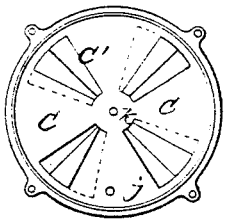

FIP8209 03 11 226

J. SPEAR.

Car Heater.

BEST AVAILABLE COPY

No. 226.

A. I. Patented March 22, 1859.

WITNESSES

W. W. Lazarus

J. H. Shakspeare

INVENTOR

James Spear

N. PETERS Photo-Lithographer, Washington, D. C.